United States Patent
Sundaram et al.

(10) Patent No.: US 7,653,066 B2
(45) Date of Patent: Jan. 26, 2010

(54) METHOD AND APPARATUS FOR GUARANTEED IN-ORDER DELIVERY FOR FICON OVER SONET/SDH TRANSPORT

(75) Inventors: Ganesh Sundaram, Rohnert Park, CA (US); Hitesh Amin, Petaluma, CA (US); John Diab, Santa Rosa, CA (US); Thomas Eric Ryle, Raleigh, NC (US); Charles Allen Carriker, Jr., Cary, NC (US); Marc Bennett, Austin, TX (US); Michael D. Blair, Cary, NC (US)

(73) Assignee: Cisco Technology Inc., San Jose, CA (US)

(*) Notice: Subject to any disclaimer, the term of this patent is extended or adjusted under 35 U.S.C. 154(b) by 903 days.

(21) Appl. No.: 10/981,400

(22) Filed: Nov. 4, 2004

(65) Prior Publication Data

US 2006/0092943 A1    May 4, 2006

(51) Int. Cl.
*H04L 12/28* (2006.01)
(52) U.S. Cl. ............... 370/394; 370/400; 370/411; 714/782
(58) Field of Classification Search .............. None
See application file for complete search history.

(56) References Cited

U.S. PATENT DOCUMENTS

| | | | |
|---|---|---|---|
| 5,610,745 A | 3/1997 | Bennett | |
| 5,638,518 A | 6/1997 | Malladi | |
| 5,941,972 A | 8/1999 | Hoese et al. | |
| 5,959,994 A | 9/1999 | Boggs et al. | |
| 6,393,489 B1 | 5/2002 | Sambamurthy et al. | |
| 6,400,730 B1 | 6/2002 | Latif et al. | |
| 6,452,906 B1 | 9/2002 | Afferton et al. | |
| 6,636,529 B1 | 10/2003 | Goodman et al. | |
| 6,654,383 B2 | 11/2003 | Haymes et al. | |
| 7,010,607 B1* | 3/2006 | Bunton ................ | 709/228 |
| 7,352,706 B2* | 4/2008 | Klotz et al. ............ | 370/254 |
| 7,376,133 B2* | 5/2008 | Gettala et al. .......... | 370/389 |
| 2002/0083190 A1 | 6/2002 | Kamiya et al. | |
| 2002/0176450 A1 | 11/2002 | Kong et al. | |
| 2003/0074449 A1 | 4/2003 | Smith et al. | |
| 2003/0091037 A1 | 5/2003 | Latif et al. | |
| 2003/0206559 A1* | 11/2003 | Trachewsky et al. ...... | 370/509 |
| 2003/0218981 A1 | 11/2003 | Scholten | |
| 2004/0047291 A1 | 3/2004 | Aln et al. | |

(Continued)

Primary Examiner—Jung Park
(74) Attorney, Agent, or Firm—Edell, Shapiro & Finnan, LLC

(57) ABSTRACT

In network systems for transporting GFP-encapsulated FICON frames across a SONET/SDH transport network between FICON ports, the transport interfaces for the FICON ports operate to drop duplicate and out-of-order frames transported across the SONET/SDH network. The transmitting transport interface inserts a sequence number incremented with each FICON frame into said one or more transport frames, whereby the sequence number is used as an index for determining duplicate and out-of-order frames after transport over said SONET/SDH network. The receiving transport interface compares sequence numbers with each FICON frame to determine duplicate and out-of-order FICON frames, drops the duplicate and out-of-order FICON frames; and sends the balance of the compared FICON frames to the receiving FICON port.

30 Claims, 4 Drawing Sheets

U.S. PATENT DOCUMENTS

| | | |
|---|---|---|
| 2004/0076175 A1 | 4/2004 | Patenaude |
| 2004/0085902 A1 | 5/2004 | Miller et al. |
| 2004/0085904 A1 | 5/2004 | Bordogna et al. |
| 2004/0202205 A1 | 10/2004 | Sheth et al. |
| 2005/0013313 A1* | 1/2005 | Liao et al. .................. 370/412 |
| 2005/0053064 A1* | 3/2005 | Wang ......................... 370/389 |
| 2005/0083833 A1* | 4/2005 | Gettala et al. ............... 370/219 |
| 2005/0147121 A1* | 7/2005 | Burrell et al. ............... 370/468 |
| 2006/0041826 A1* | 2/2006 | Bhattacharya et al. ...... 714/782 |
| 2006/0224659 A1* | 10/2006 | Yu ............................. 709/201 |

* cited by examiner

METHOD AND APPARATUS FOR GUARANTEED IN-ORDER DELIVERY FOR FICON OVER SONET/SDH TRANSPORT

BACKGROUND OF THE INVENTION

The present invention relates generally to digital communication networks, and more specifically, to methods and systems for efficiently transporting Fibre Channel/FICON client data over a SONET/SDH network path.

SONET/SDH and optical fiber have emerged as significant technologies for building large scale, high speed, IP (Internet Protocol)-based networks. SONET, an acronym for Synchronous Optical Network, and SDH, an acronym for Synchronous Digital Hierarchy, are a set of related standards for synchronous data transmission over fiber optic networks. SONET/SDH is currently used in wide area networks (WAN) and metropolitan area networks (MAN). A SONET system consists of switches, multiplexers, and repeaters, all connected by fiber. The connection between a source and destination is called a path.

One network architecture for the network interconnection of computer devices is Fibre Channel, the core standard of which is described in ANSI (American National Standards Institute) X3.230-1994. Arising out of data storage requirements, Fibre Channel currently provides for bidirectional gigabits-per-second transport over communication networks in Fibre Channel frames that consist of standardized sets of bits used to carry data over the network system. Fibre Channel links are limited to no more than 10 kilometers. Similar to Fibre Channel is FICON, a proprietary I/O channel which was developed by IBM for the data storage requirements for main frame computers.

New standards and protocols have emerged to combine the advantages of the SONET/SDH and Fibre Channel/FICON technologies. For example, it is sometimes desirable to link two SANs (Storage Area Networks), which operate with Fibre Channel or FICON protocols, over a MAN (Metropolitan Area Network), or even a WAN (Wide Area Network), which typically operate under SONET or SDH standards. This extension of Fibre Channel/FICON from 100 kilometers to over several hundred, or even thousand, kilometers, is made by mapping Fibre Channel/FICON ports to a SONET/SDH path for transport across a SONET/SDH network. One way to perform this function is to encapsulate Fibre Channel/FICON client data frames into transparent Generic Framing Protocol (GFP-T) frames and then map the GFP-T frames into SONET/SDH frames for transport across the SONET/SDH network. In this manner two Fibre Channel/FICON ports can communicate with each other over a SONET/SDH network as though the intervening network links are part of a Fibre Channel/FICON network. The Fibre Channel/FICON ports remain "unaware" of the SONET/SDH transport path.

However, even though Fibre Channel and FICON equipment are very similar, there are some crucial differences. For example, Fibre Channel devices handle duplicate frames and out-of-order frames much more reliably than FICON devices which may lockup when duplicate or out-of-order frames are received. Such duplicate or out-of-order frames are created under various SONET protection mechanisms, such as Unidirectional Path Switch Ring (UPSR) and Bidirectional Lines Switch Ring (BLSR), mainly because the same Fibre Channel/FICON data is bridged between two links under SONET/SDH protection and when span lengths are different between active and standby paths.

Since FICON protocol has difficulty in handling duplicate and out-of-order frames, there is a need for some mechanism by which duplicate and out-of-order frames are blocked. The present invention provides for such a mechanism which operates effectively for FICON (and Fibre Channel) frames.

SUMMARY OF THE INVENTION

The present invention provides for a method of operating a transport interface for at least one local Fibre Channel/FICON port, which transport interface has a mechanism to drop duplicate and out-of-order frames transported over a SONET/SDH network. The method has the steps of: receiving Fibre Channel/FICON frames from the local Fibre Channel/FICON port for transmission to at least one remote Fibre Channel/FICON port; encapsulating the Fibre Channel/FICON frames into one or more transport frames for transport over the SONET/SDH network from the local Fibre Channel/FICON port to the remote Fibre Channel/FICON port; and inserting a sequence number with each Fibre Channel/FICON frame into the transport frames; whereby the sequence number is used as an index for determining duplicate and out-of-order frames after transport over the SONET/SDH network.

The present invention also provides for a method with the steps of: decapsulating the Fibre Channel/FICON frames from one or more transport frames after transport over the SONET/SDH network to a local Fibre Channel/FICON port; comparing sequence numbers, each sequence number inserted with each Fibre Channel/FICON frame into the transport frames, to determine duplicate and out-of-order Fibre Channel/FICON frames; dropping the duplicate and out-of-order Fibre Channel/FICON frames; and sending the balance of the compared Fibre Channel/FICON frames to the local Fibre Channel/FICON port. Other steps include incrementing the sequence number with each Fibre Channel/FICON frame; and inserting a special control character to indicate the sequence number.

The present invention also provides for a first transport interface in a network system for transporting GFP-encapsulated Fibre Channel/FICON frames across a SONET/SDH transport network between first and second Fibre Channel/FICON ports, the first Fibre Channel/FICON port connected to the SONET/SDH transport network through the first transport interface and the second FICON port connected to the SONET/SDH transport network through a second transport interface. The first transport interface has at least one integrated circuit adapted to encapsulate Fibre Channel/FICON frames from the first Fibre Channel/FICON port into one or more transport frames for transport over the SONET/SDH network to the second Fibre Channel/FICON port; and to insert a sequence number with each Fibre Channel/FICON frame into the one or more transport frames, the sequence number operative as an index for determining duplicate and out-of-order frames after transport over the SONET/SDH network. The integrated circuit is further adapted to increment the sequence number with each Fibre Channel/FICON frame and to insert a control character with sequence number to indicate the sequence number.

The present invention also provides for the second transport interface which has at least one integrated circuit adapted to decapsulate Fibre Channel/FICON frames from one or more transport frames after transport over the SONET/SDH network from the first Fibre Channel/FICON port; to compare sequence numbers, each sequence number inserted with each Fibre Channel/FICON frame into the one or more transport frames, for determining duplicate and out-of-order Fibre Channel/FICON frames, to drop the duplicate and out-of-order Fibre Channel/FICON frames; and to send the balance of the compared Fibre Channel/FICON frames to said the second Fibre Channel/FICON port.

DESCRIPTION OF SPECIFIC EMBODIMENTS

Figure 1A:
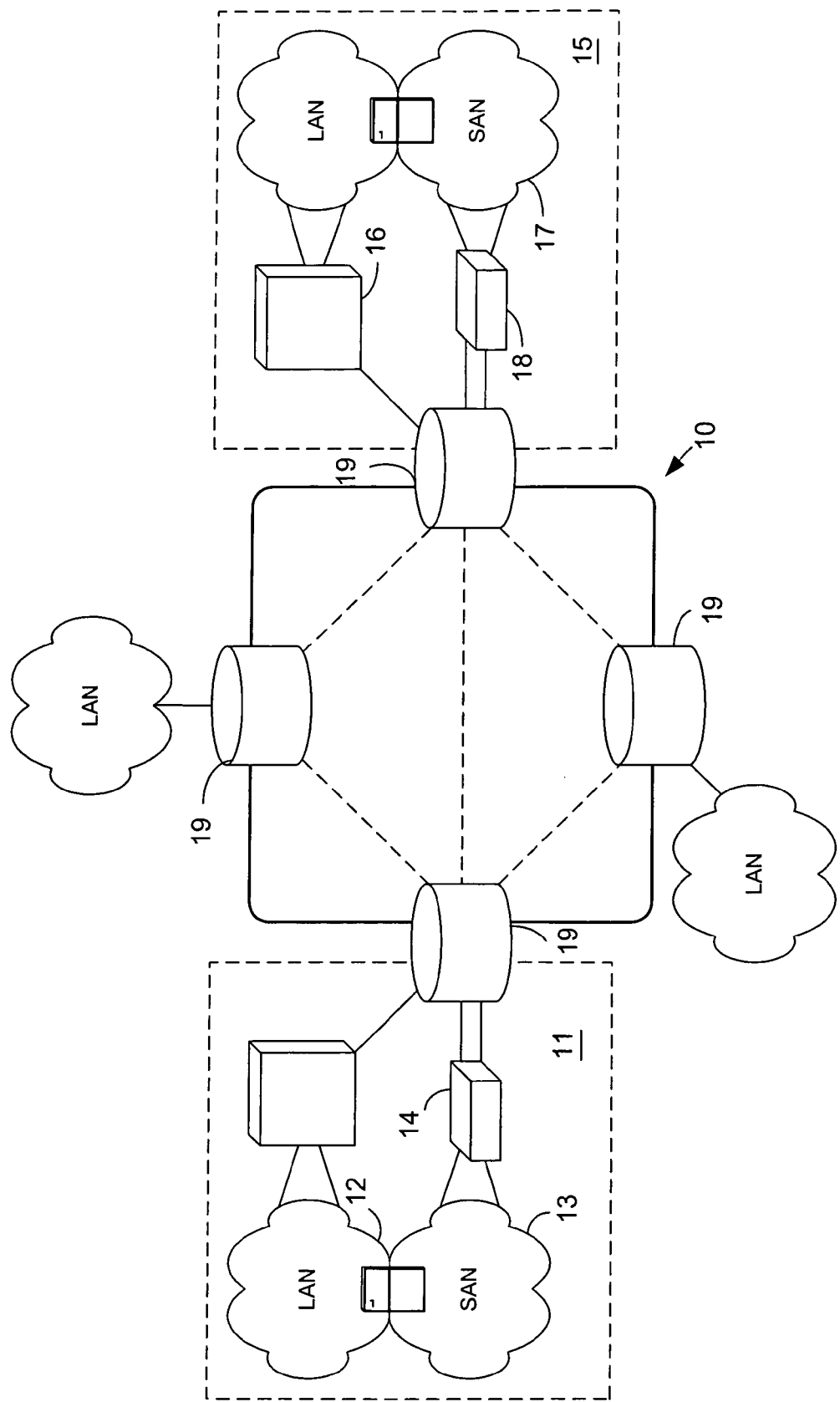
FIG. 1A is a representational diagram showing how an SONET/SDH network might be used to connect different network systems, including Fibre Channel and FICON.
Figure 1B:
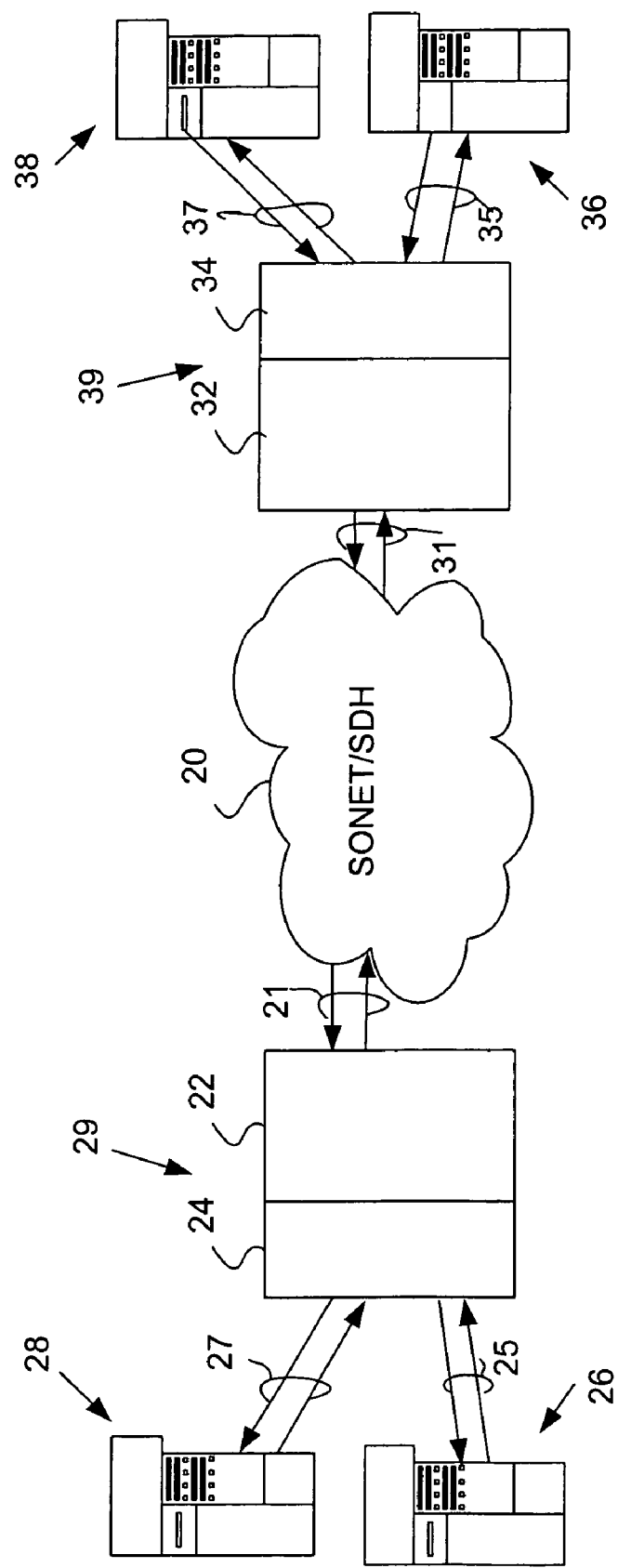
FIG. 1B is a more detailed diagram illustrating the connection of two Fibre Channel/FICON systems across an SONET/SDH transport path, according to one embodiment of the present invention.

The present invention provides for an effective mechanism for blocking duplicate and/or out-of-order frames encapsulated in GFP-T frames for transport over SONET/SDH networks. FIGS. 1A and 1B show an exemplary network in which the present invention might operate. The network has a primary data center 11 with a local area network (LAN) 12 and interconnected Storage Area Network (SAN) 13 might be connected to a backup data center 15 with its local area network (LAN) 16 and interconnected Storage Area Network (SAN) 17 over a SONET/SDH transport network 10, in this case, an OC-48 (Optical Carrier-48) ring. The Storage Area Networks operate under Fibre Channel or FICON protocol and Fibre Channel/FICON switches 14 and 18 operate as a Fibre Channel/FICON ports and are connected to different transport interfaces 19 respectively for the transport of Fibre Channel/FICON data frames over the SONET/SDH transport network 10 between the two data centers 11 and 15. In this manner, the Storage Area Network 13 is extended to the Storage Area Network 17, and vice versa.

FIG. 1B illustrates more details of the connection of the Fibre Channel/FICON ports (and Fibre Channel/FICON networks) over a SONET/SDH network, according to the present invention. In this exemplary and simplified network, a SONET/SDH network 20 has transport interfaces 29 and 39 connected to Fibre Channel/FICON ports 26, 28 and 36, 38 respectively. The Fibre Channel/FICON ports 26, 28, 36 and 38 are associated with elements which are interconnected by Fibre Channel, such as data storage elements in a Storage Area Network topology, including disk drive arrays, RAIDs, disk farms, or as possibly other Fibre Channel/FICON elements, such as routers, switches, or other Fibre Channel/FICON network elements.

The Fibre Channel/FICON ports 26 and 28 operate under Fibre Channel/FICON protocol and are connected by Fibre Channel/FICON links 25 and 27 respectively to a multi-port Fibre Channel/FICON card 24. Likewise, a second Fibre Channel port card 34 is connected by Fibre Channel/FICON links 35 and 37 to Fibre Channel ports 36 and 38 respectively. Each Fibre Channel/FICON port card 24 and 34 is connected to a pair of Fibre Channel/FICON ports for purposes of illustration, and more ports may be connected to each Fibre Channel/FICON port card.

The Fibre Channel/FICON port cards 24 and 34, together with optical transport platforms 22 and 32, such as ONS 15454 (available from Cisco Systems, Inc. of San Jose, Calif.), form the transport interfaces 29 and 39 respectively, which provide the interfaces between the Fibre Channel/FICON elements/networks and the SONET/SDH network 20. The multi-port Fibre Channel/FICON card 24 is adapted to fit into the optical transport platform 32; and the multi-port Fibre Channel/FICON card 34 is adapted to fit into the optical transport platform 32. Through the Fibre Channel/FICON port cards 24 and 34, and the platforms 22 and 32 respectively, the Fibre Channel/FICON ports 26 and 28 are interconnected to the Fibre Channel/FICON ports 36 and 38 across the SONET/SDH network transport path. The result is that there are two virtual wires for the connection between a representative Fibre Channel/FICON port at one end of the SONET/SDH network 10, say, port 26, and a representative Fibre Channel/FICON port at the other end, say, port 36.

GFP-T, transparent Generic Framing Procedure as defined by the International Telecommunications Union standard, specifically ITU-T G.7041, is used as the framing protocol for such a network for encapsulating the Fibre Channel/FICON payloads at one end of the SONET/SDH network 10 to be transmitted across the SONET/SDH network and for decapsulating the Fibre Channel/FICON data at the other end. The port cards 24 and 34, and their respective optical platforms 22 and 32, provide the transparent transport interfaces between the Fibre Channel/FICON ports 28 and 38 over the SONET/SDH network 20 in the exemplary network of FIG. 1B.

Duplicate and out-of-order frames are created by the exemplary SONET/SDH network 20 which may operate with various protection schemes, e.g., UPSR (Unidirectional Path Switched Ring), BLSR (Bidirectional Lines Switched Ring) and 1+1, against breaks or "glitches" in the links between nodes of the SONET/SDH network 20. Since the same Fibre Channel/FICON traffic is bridged between two different links by these protection schemes, there is a good possibility of receiving duplicate or out-of-order frames if the switchover occurs from a short link to a longer link.

As stated above, Fibre Channel devices are more robust in handling such duplicate or out-of-order frames than FICON devices. Thus, in the case of the exemplary network of FIGS. 1A and 1B, there may be problems of device lockup with duplicate or out-of-order frames generated by the SONET/SDH network 20 if the SAN networks 13 and 17 operate under FICON protocol, rather than Fibre Channel.

The present invention provides for a mechanism by which all such duplicate and out-of-order frames are dropped and are not forwarded, very useful for FICON data frames (and also for Fibre Channel data frames). Thus the present invention is described in terms of Fibre Channel/FICON protocols because the two protocols are so similar.

In passing, it should be noted that for Fibre Channel/FICON networks there is a special "IOD" (In Order Delivery) mode which eliminates the chances of duplicate frames. Due to switching fabric reconvergences, frames may arrive out-of-order to an Fibre Channel switch. If the IOD mode is engaged, then the switch delays forwarding frames through a new route until a certain time has passed. Thus guarantees that all the old frames reach their destination first. However, this IOD feature is limited and operative only when there are link state changes or FSPF (Fabric Shortest Path First) routing updates, not the events toward which the present invention is directed.

In accordance with the present invention, a sequence number is attached immediately following the start-of-frame (SOF) delimiter of every Fibre Channel/FICON frame that needs to be transmitted over SONET/SDH. This sequence number is incremented for each Fibre Channel/FICON frame that is transmitted over the SONET/SDH transport network. This sequence number has a special K character that is not be used in the Fibre Channel/FICON protocol and is never forwarded to the Fibre Channel/FICON client. It is only used between the Fibre Channel/FICON-Over-SONET/SDH equipment, such as the transport interfaces 29 and 39 and the connecting SONET/SDH transport network 20 in the FIG. 1B network, for example.

buffer negotiation is complete), monitor for Fibre Channel/FICON SOF (Start of Frame) and increment a sequence counter; and 2) monitor a delayed SOF trigger and insert a sequence number in the data path. The Ingress Path pseudocode is as follows:

```
All *rst* (reset) signals are to initialize registers so they start in a known state.
// INGRESS PATH
    // If insertion of sequence number is enabled, monitor for Fibre Channel/FICON Start
    // of Frame and enable trigger. Otherwise, do not enable trigger.
            if (!rst_In_106N)
                rd_en_seq <= 0
            else
                rd_en_seq <= cpu_reg? sof_seq : 1'h0;
    // If we get a trigger, increment the sequence counter, seq_no. This counter increments
    // with every new Fibre Channel/FICON frame.
            if (!rd_en_seq )
                seq_no <= 0;
            else if (rd_en_seq)
                seq_no <= seq_no + 1'h1;
    // Insert the sequence after SOF. The sequence is made of total of 36 bits. (Sequence
    // shall be 36 bit 0x8_21_xx_xx_xx). Lower 24 bits is seq_no (which increments every
    // Fibre Channel/FICON frame). Value of 0x21 is total of 8 bits. This is a special K
    // character used to identify the sequence number in the data stream. Upper four bits are
    // set to 0x8. This indicates that it is a K character and it will get mapped properly into
    // GFP-T frames. Ing_data is the Fibre Channel/FICON channel data coming from the
    // client and this data will be passed to GFP-T block for mapping into frames.
            if ( rd_en_seq_d3)
                ing_data <= {12'h821, seq_no};
            else
                ing_data <= data;
    // Add Data Validation for sequence number If the data valid is present, then the data
    // will be passed for the GFP-T mapping block.
            ing_data_gnt <= data_gnt | rd_en_seq_d3;
```

At the far or receiving end, the GFP receiver when it receives the data, looks at the sequence number to decide whether to forward the data to the Fibre Channel/FICON client or to drop it. If the far end receiver receives any frame with a sequence number below or equal to the sequence number it has already forwarded, the frame is dropped—thus avoiding duplicate and out-of-order frames. If the sequence number received is larger than the last sequence number processed, then the frame is forwarded to the Fibre Channel/FICON client. Also, the far end GFP receiver drops any bad CRC (Cyclic Redundancy Check) frames that may be received because of B3 (Path BIP-8) errors or due to SONET/SDH switchovers. In the Fibre Channel/FICON environment, it is better to drop frames rather than sending duplicate or out-of-order frames.

The following exemplary pseudocode illustrates the present invention and its operation in greater detail. The sequence number is inserted at the Ingress path (the entry path into the SONET/SDH transport network) and the incremented sequence number is monitored at the Egress receiving path (the exit path from the SONET/SDH transport network), e.g., the transport interfaces 29 and 39 in FIG. 1B. If the difference in consecutive sequence numbers is not positive, then the second frame is dropped by triggering a bad CRC (Cyclic Redundancy Check) so that Fiber Channel/FICON duplicate and out-of-order frames that may occur due to SONET/SDH switchovers are dropped.

Figure 2:
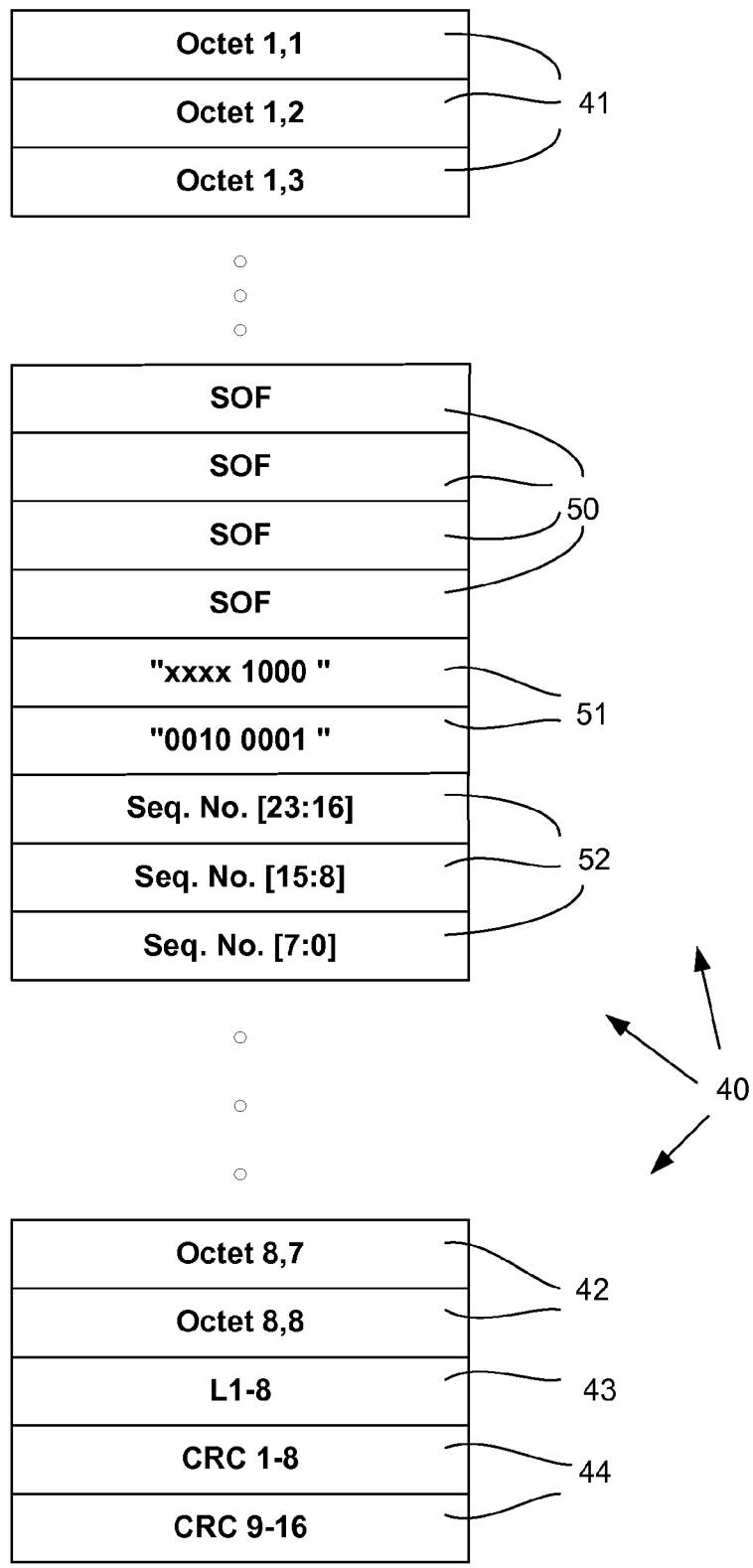
FIG. 2 is a representative diagram of a GFP-T superblock with inserted sequence number and special control character, according to one embodiment of the present invention.

In the Ingress Path, the 24 bit sequence number and a special control character are inserted with every Fibre Channel/FICON frame. This is performed by two functions: 1) If enabled by software (after Fibre Channel/FICON buffer-to- FIG. 2 is a exemplary diagram of a GFP-T superblock 40 to illustrate the result of the pseudocode of the Ingress Path. A GFP-T superblock has eight 64B/65B code blocks with the first 64B/65B code block appearing first in eight bytes 41 as Octets 1,1-8, then the second 64B/65B code block in eight bytes 42 as Octets 2,1-8 and so on to the eighth 64B/65B code block appearing in eight bytes as Octets 8,1-8. Then a byte 43 is formed by each of the leading or flag bits L1-8 of the eight 64B/65B code block and then two bytes 44 of Cyclic Redundancy Check bits CRC1-16. The FIG. 2 superblock has a FICON SOF (Start-of-Frame) of 4 bytes 50 and is followed by the special 12-bit control character "821" in hexadecimal or "1000 0010 0001" in binary in two bytes 51, and a 24-bit sequence number in three bytes 52. Note that the special control character and sequence number occupies 5 bytes 51 and 52, or octets in ITU terminology. The first byte 51 following the SOF contains 4 "don't care" or X bits, and the binary "8" of the special control character.

In the Egress path, the received sequence numbers are compared. If the difference is negative, then CRC bit is updated as bad CRC so the downstream Fibre Channel/FICON port drops the FICON frame. This is performed by five functions: 1) Create a strobe to latch the sequence number; 2) Update OLD sequence number if the new sequence has a greater value; 3) Calculate the sequence difference; 4) Create a drop data strobe if difference has negative value; and 5) Flag the CRC bit as bad CRC if drop sequence strobe is enabled. The Egress Path pseudocode is as follows:

```
// EGRESS PATH
    // Create a strobe to latch Sequence by looking for special K character with a value in
    // the data stream. This 36-bit data contains the sequence number in the lower 24 bits.
        assign eg_valid_seq_en = egress_wren & (egress_dout [35:24] == 12'h821);
    // Latch Sequence value, storing the newly detected sequence number in a register.
        if (reset | !cpu_reg)
            eg_valid_seq_new <= 0;
        else if (eg_valid_seq_en)
            eg_valid_seq_new <= egress_dout ;
    // Update OLD sequence if new is greater value. Old sequence number is only updated
    // with new value if the new value is greater than old value. Otherwise, the old sequence
    // value is kept.
        if (reset | !cpu_reg)
            eg_valid_seq_old <= 0;
        else if (eg_valid_seq_en_d3) & ((seq_diff[22:0] != 1'b0) & !seq_diff[23])
            eg_valid_seq_old <= eg_valid_seq_new;
    // Calculate Sequence difference
        seq_diff <= {1'b1,eg_valid_seq_new} - eg_valid_seq_old;
    // Create a Drop Data Strobe if difference is negative or same value than the old
    // sequence.
        assign drop_bseq_data = !((seq_diff[22:0] != 1'b0) & !seq_diff[23]) &
eg_valid_seq_en_d3;
    // Flag the CRC bit as bad CRC if drop sequence strobe is enabled. This drops duplicate
    // and out-of-order frames and also counts as dropped frames.
        egress_bad_crc <= egress_bad_crc |drop_bseq_data ;
```

The embodiment of the present invention described above is best implemented in the port cards 24 and 34 in the exemplary network of FIG. 1B. A hardware implementation in an ASIC (Application Specific Integrated Circuit) or an FPGA (Field Programmable Gate Array) is preferred for a high-speed implementation of the present invention for optimal response to the creation of duplicate and out-of-order frames in the transmission of Fibre Channel/FICON frames across the SONET/SDH transport network 20.

Figure 3:
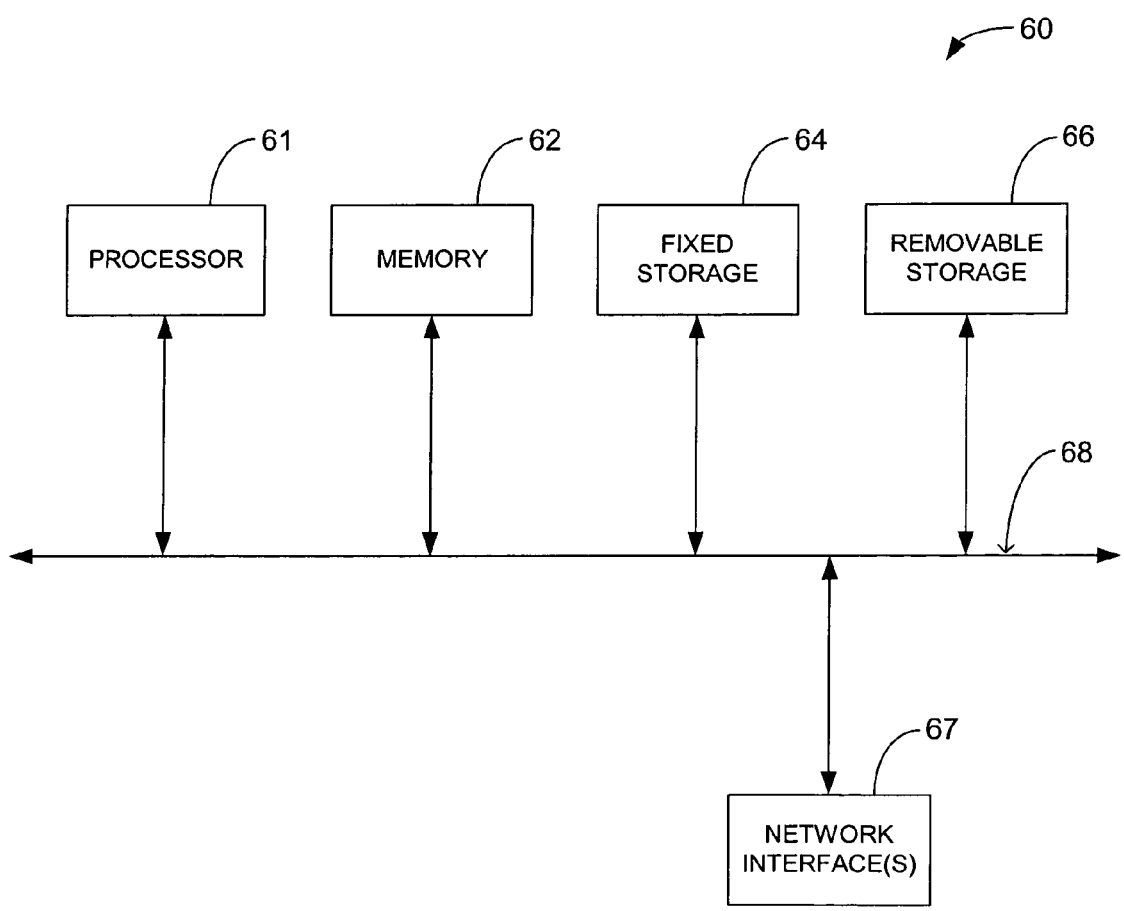
FIG. 3 is a block diagram of a portion of port card of FIG. 1B, according to one embodiment of the present invention.

The present invention might also be implemented in firmware, such as the ROM (Read-Only Memory) of a microcontroller in the port cards 24 and 34, or in software which offers certain advantages. For instance, a port card processor unit instructed by the software might perform operations described above, as well as other operations. Upgrades can be made easily in software. FIG. 3 shows a block diagram of a representative computer system 60 that may be used to execute the software of an embodiment of the invention. The computer system 60 includes memory 62 which can store and retrieve software programs incorporating computer code that implements aspects of the invention, data for use with the invention, and the like. Exemplary computer readable storage media include CD-ROM, floppy disk, tape, through for the Fibre Channel/FICON port cards 24 and 34 (and transport interfaces 29 and 39) flash memory, semiconductor system memory, and hard drive are more suitable at the present state of technology. The computer system 60 further includes subsystems, such a central processor 61, fixed storage 64 (e.g., hard drive) and one or more network interfaces 67, all connected by a system bus 68. Other computer systems suitable for use with the invention may include additional or fewer subsystems. For example, computer system 60 may include more than one processor 61 (i.e., a multi-processor system) or a cache memory.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A method of operating a transport interface for at least one local port associated with a first protocol by which frames are transmitted and received in order, said transport interface providing a mechanism to drop duplicate and/or out of-order frames transported over a synchronous network that generates duplicate frames according to a second protocol, said method comprising:
   receiving a plurality of first protocol frames in order from said at least one local port for transmission to at least one remote port;
   encapsulating said plurality first protocol frames in said received order into one or more second protocol frames for transport over said synchronous network from said at least one local port to said at least one remote port;
   inserting a sequence number with each first protocol frame into said one or more second protocol frames in said order, wherein said sequence number is used as an index for determining duplicate and/or out-of order first protocol frames after transport over said synchronous network, and wherein a drop data strobe is generated for each said determined duplicate and/or out of order first protocol frames; and
   inserting a control character with said sequence number with each first protocol frame into said one or more second protocol frames, wherein said control character indicates said sequence number is active for a corresponding first protocol frame.

2. The method of claim 1, wherein said one or more second protocol frames comprise synchronous optical network (SONET) or synchronous digital hierarchy (SDH) frames.

3. The method of claim 2, wherein said SONET or SDH frames comprise Generic Framing Protocol-T (GFP-T) frames.

4. The method of claim 1, further comprising incrementing said sequence number to indicate said order for each said received first protocol frame.

5. The method of claim 1, wherein said control character comprises an upper nibble of 0x8h indicating that said control character is a K character code ensuring a proper mapping into a GFP frame.

6. The method of claim 1, wherein said control character indicates a valid sequence number.

7. The method of claim 1, wherein a cyclic redundancy check (CRC) for each said determined duplicate and/or out-of-order first protocol frames is failed when said drop data strobe is enabled.

8. A method of operating a transport interface for at least one local port associated with a first protocol in which frames are transmitted and received in order, said transport interface providing a mechanism to drop duplicate and/or out-of-order frames transported over a synchronous network that generates duplicate frames according to a second protocol, said method comprising:
   decapsulating a plurality of first protocol frames from one or more second protocol frames in received order after transport over said synchronous network from at least one remote port to said at least one local port;
   comparing sequence numbers in said received order, each sequence number inserted with each first protocol frame into said one or more second protocol frames, to determine duplicate and/or out-of order first protocol frames, wherein a control character inserted with each sequence number with each first protocol frame in said one or more second protocol frames is checked to determine if said sequence number is active for a corresponding first protocol frame; and
   generating a drop data strobe such that each said duplicate and/or out-of-order first protocol frames is dropped.

9. The method of claim 8, wherein said one or more second protocol frames comprise synchronous optical network (SONET) or synchronous digital hierarchy (SDH) frames.

10. The method of claim 9, wherein said SONET or SDH frames comprise Generic Framing Protocol-T (GFP-T) frames.

11. The method of claim 8, wherein said control character comprises an upper nibble of 0x8h indicating that said control character is a K character code validly mapped into a GFP frame.

12. The method of claim 8, wherein said control character indicates a valid sequence number.

13. The method of claim 8, wherein comparing comprises comparing consecutive sequence numbers of decapsulated first protocol frames in said received order to a processed sequence number and if a consecutive sequence number is not larger than said processed sequence number then determining a decapsulated first protocol frame associated with said consecutive sequence number is a duplicate or out-of order frame.

14. The method of claim 8, wherein comparing further comprises:
   subtracting a sequence number of a previously forwarded first protocol frame from a sequence number of a decapsulated first protocol frame to produce a difference; and
   determining that said decapsulated first protocol frame is a duplicate or out-of order frame if said difference is equal or less than zero.

15. The method of claim 8, wherein a cyclic redundancy check (CRC) for each said duplicate and/or out-of-order first protocol frames is failed when said drop data strobe is enabled.

16. The method of claim 8, further comprising sending properly received first protocol frames to said at least one local port.

17. In a network system for transporting Generic Framing Protocol (GFP)-encapsulated Fibre Channel/FICON frames across a synchronous optical network (SONET) or synchronous digital hierarchy (SDH) transport network between first and second Fibre Channel/FICON ports, said first Fibre Channel/FICON port connected to said SONET/SDH transport network through a first transport interface and said second Fibre Channel/FICON port connected to said SONET/SDH transport network through a second transport interface, said first transport interface comprising:
   at least one integrated circuit configured to encapsulate Fibre Channel/FICON frames from said first Fibre Channel/FICON port into one or more transport frames in order for transport over said SONET/SDH network to said second Fibre Channel/FICON port; and to insert a sequence number in said order with each Fibre Channel/FICON frame into said one or more transport frames, said sequence number operative as an index for determining duplicate and/or out-of-order frames after transport over said SONET/SDH network, wherein a drop data strobe is generated for each said determined duplicate and/or out of order Fibre Channel/FICON frames, and wherein said at least one integrated circuit is further configured to insert a control character with said sequence number with each Fibre Channel/FICON frame into said one or more transport frames, said control character indicating said sequence number is active for a corresponding Fibre Channel/FICON frame.

18. The first transport interface of claim 17, wherein said at least one integrated circuit is configured to increment said sequence number to indicate said order for each Fibre Channel/FICON frame from said first Fibre Channel/FICON port.

19. The first transport interface of claim 17, wherein said control character comprises an upper nibble of 0x8h indicating that said control character is a K character code ensuring a proper mapping into a GFP frame.

20. The first transport interface of claim 17, wherein said control character indicates a valid sequence number.

21. The first transport interface of claim 17, wherein a cyclic redundancy check (CRC) for each said determined duplicate and/or out-of-order first protocol frames is failed when said drop data strobe is enabled.

22. In a network system for transporting Generic Framing Protocol (GFP)-encapsulated FICON frames across a synchronous optical network (SONET) or synchronous digital hierarchy (SDH) transport network between first and second Fibre Channel/FICON ports, said first Fibre Channel/FICON port connected to said SONET/SDH transport network through a first transport interface and said second Fibre Channel/FICON port connected to said SONET/SDH transport network through a second transport interface, said second transport interface comprising:
   at least one integrated circuit configured to decapsulate Fibre Channel/FICON frames from one or more transport frames after transport over said SONET/SDH network from said first Fibre Channel/FICON port; to compare sequence numbers in received order, each sequence number inserted with each Fibre Channel/FICON frame into said one or more transport frames, for determining duplicate and/or out-of-order Fibre Channel/FICON frames, and to generate a drop data strobe such that each said duplicate and/or out-of-order Fibre Channel/FICON frames is dropped, wherein said at least one integrated circuit is configured to check a control character inserted with each sequence number with each Fibre Channel/FICON frame in said one or more transport frames to indicate said sequence number is active for a corresponding Fibre Channel/FICON frame.

23. The second transport interface of claim 22, wherein said control character comprises an upper nibble of 0x8h indicating that said control character is a K character code is validly mapped into a GFP frame.

24. The second transport interface of claim 22, wherein said control character indicates a valid sequence number.

25. The second transport interface of claim 22, wherein said integrated circuit is configured to compare consecutive sequence numbers of decapsulated Fibre Channel/FICON frames in said received order to a processed sequence number and if a consecutive sequence number is not larger than said processed sequence number then determining a decapsulated Fibre Channel/FICON frame associated with said consecutive sequence number is a duplicate or out-of order frame.

26. The second transport interface of claim 22, wherein said integrated circuit is configured to subtract a sequence number of a previously forwarded Fibre Channel/FICON frame from a sequence number of a decapsulated Fibre Channel/FICON frame to produce a difference; and to determine that said decapsulated Fibre Channel/FICON frame is a duplicate or out-of-order frame if said difference is equal or less than zero.

27. The second transport interface of claim 22, wherein a cyclic redundancy check (CRC) for each said duplicate and/or out-of-order first protocol frames is failed when said drop data strobe is enabled.

28. The second transport interface of claim 22, wherein said integrated circuit is further configured to send properly received Fibre Channel/FICON frames to said second Fibre Channel/FICON port.

29. In a network system for transporting Generic Framing Protocol (GFP)-encapsulated Fibre Channel/FICON frames across a synchronous optical network (SONET) or synchronous digital hierarchy (SDH) transport network between first and second Fibre Channel/FICON ports, said first Fibre Channel/FICON port connected to said SONET/SDH transport network through a first transport interface and said second Fibre Channel/FICON port connected to said SONET/SDH transport network through a second transport interface, said first transport interface comprising:

means for encapsulating said plurality of Fibre Channel/FICON frames into one or more transport frames in order for transport over said SONET/SDH network from said first Fibre Channel/FICON port to said second Fibre Channel/FICON port;

means for inserting a sequence number in said order with each Fibre Channel/FICON frame into said one or more transport frames said sequence number is used as an index for determining duplicate and/or out-of order frames after transport over said SONET/SDH network, wherein a drop data strobe is generated for each said determined duplicate and/or out of order Fibre Channel/FICON frames; and means for inserting a control character with said sequence number with each Fibre Channel/FICON frame into said one or more transport frames, said control character indicating said sequence number is active for a corresponding Fibre Channel/FICON frame.

30. In a network system for transporting Generic Framing Protocol (GFP)-encapsulated Fibre Channel/FICON frames across a synchronous optical network (SONET) or synchronous digital hierarchy (SDH) transport network between first and second Fibre Channel/FICON ports, said first Fibre Channel/FICON port connected to said SONET/SDH transport network through a first transport interface and said second Fibre Channel/FICON port connected to said SONET/SDH transport network through a second transport interface, said second transport interface comprising:

means for decapsulating a plurality of Fibre Channel/FICON frames from one or more GFP frames after transport over said SONET/SDH network from said first Fibre Channel/FICON port to said second Fibre Channel/FICON port;

means for comparing sequence numbers in received order, each sequence number inserted with each Fibre Channel/FICON frame into said one or more GFP frames, to determine duplicate and/or out-of order Fibre Channel/FICON frames;

means for checking a control character inserted with each sequence number with each Fibre Channel/FICON frame in said one or more GFP frames to determine if said sequence number is active for a corresponding Fibre Channel/FICON frame; and means for generating a drop data strobe that causes a cyclic redundancy check for said duplicate and/or out-of-order Fibre Channel/FICON frames to fail such that each said duplicate and/or out-of-order Fibre Channel/FICON frames is dropped.

\* \* \* \* \*

UNITED STATES PATENT AND TRADEMARK OFFICE
CERTIFICATE OF CORRECTION

PATENT NO. : 7,653,066 B2 Page 1 of 1
APPLICATION NO. : 10/981400
DATED : January 26, 2010
INVENTOR(S) : Sundaram et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1166 days.

Signed and Sealed this

Twenty-eighth Day of December, 2010

David J. Kappos
*Director of the United States Patent and Trademark Office*